US012573908B2

(12) United States Patent
Kloninger et al.

(10) Patent No.: US 12,573,908 B2
(45) Date of Patent: Mar. 10, 2026

(54) ELECTRIC MACHINE FOR A MOTOR VEHICLE, USE OF SUCH AN ELECTRIC MACHINE, AND MOTOR VEHICLE

(71) Applicant: Bayerische Motoren Werke Aktiengesellschaft, Munich (DE)

(72) Inventors: Christian Kloninger, Wielenbach (DE); Joerg Volgmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 504 days.

(21) Appl. No.: 18/011,227

(22) PCT Filed: Jun. 18, 2021

(86) PCT No.: PCT/EP2021/066527
§ 371 (c)(1),
(2) Date: Dec. 19, 2022

(87) PCT Pub. No.: WO2022/008204
PCT Pub. Date: Jan. 13, 2022

(65) Prior Publication Data
US 2023/0253851 A1     Aug. 10, 2023

(30) Foreign Application Priority Data
Jul. 8, 2020    (DE) .................... 10 2020 117 995.2

(51) Int. Cl.
| | | |
|---|---|---|
| *H02K 3/28* | (2006.01) |
| *C08G 59/24* | (2006.01) |
| *C08K 5/1539* | (2006.01) |
| *H02K 3/30* | (2006.01) |
| *H02K 3/38* | (2006.01) |
| *H02K 7/00* | (2006.01) |

(52) U.S. Cl.
CPC ............... *H02K 3/38* (2013.01); *C08G 59/24* (2013.01); *C08K 5/1539* (2013.01); *H02K 3/30* (2013.01); *H02K 7/006* (2013.01)

(58) Field of Classification Search
CPC .. H02K 3/30; H02K 3/38; H02K 1/04; H02K 15/105; H02K 7/006; C08K 5/1539
See application file for complete search history.

(56) References Cited

U.S. PATENT DOCUMENTS

| | | |
|---|---|---|
| 5,158,826 A | 10/1992 | Ihlein et al. |
| 5,982,056 A | 11/1999 | Koyama et al. |
| (Continued) | | |

FOREIGN PATENT DOCUMENTS

| | | | |
|---|---|---|---|
| CN | 103122125 A | * 5/2013 | |
| CN | 111040698 A | * 4/2020 | ............ C09J 163/00 |
| (Continued) | | | |

OTHER PUBLICATIONS

WO-2008006678-A1, allpages (Year: 2008).*
(Continued)

*Primary Examiner* — Naishadh N Desai
(74) *Attorney, Agent, or Firm* — Crowell & Moring LLP

(57) ABSTRACT
An electric machine for a motor vehicle includes at least one winding which has at least one partial region embedded into a casting material. The casting material is a mixture including at least one cycloaliphatic epoxide resin and at least one anhydride.

7 Claims, 1 Drawing Sheet

(56) References Cited

U.S. PATENT DOCUMENTS

| | | | |
|---|---|---|---|
| 6,187,435 | B1 | 2/2001 | Moireau et al. |
| 6,673,463 | B1 | 1/2004 | Onishi et al. |
| 2005/0189834 | A1 | 9/2005 | Ikeda et al. |
| 2015/0010697 | A1 | 1/2015 | Soncini et al. |
| 2018/0262073 | A1 | 9/2018 | Takagi et al. |
| 2018/0323685 | A1 | 11/2018 | Blum et al. |
| 2020/0112281 | A1 * | 4/2020 | Ziegltrum ............. B60L 15/007 |
| 2021/0035705 | A1 | 2/2021 | Huber et al. |
| 2022/0029491 | A1 * | 1/2022 | Huber ..................... C08L 63/00 |

FOREIGN PATENT DOCUMENTS

| | | | | |
|---|---|---|---|---|
| DE | 1 769 575 | A1 | 9/1971 | |
| DE | 2 206 528 | A1 | 8/1973 | |
| DE | 697 07 973 | T2 | 8/2002 | |
| DE | 101 22 425 | A1 | 11/2002 | |
| DE | 600 13 650 | T2 | 2/2005 | |
| DE | 696 33 555 | T2 | 2/2005 | |
| DE | 69633105 | T2 * | 8/2005 | ............. C03C 25/26 |
| DE | 10 2012 202 161 | A1 | 8/2013 | |
| DE | 102016200186 | A1 * | 7/2017 | ............. H02K 15/12 |
| DE | 10 2018 202 058 | A1 | 8/2019 | |
| DE | 102018218866 | A1 * | 5/2020 | ............. C08K 3/013 |
| JP | 2004297976 | A * | 10/2004 | ............. H02K 15/12 |
| WO | WO 90/00802 | A1 | 1/1990 | |
| WO | WO-2008006678 | A1 * | 1/2008 | ............... H02K 3/38 |
| WO | WO-2014117773 | A2 * | 8/2014 | ............... H02K 1/04 |
| WO | WO-2014147072 | A1 * | 9/2014 | ............... C08K 9/04 |
| WO | WO 2015/071901 | A1 | 5/2015 | |
| WO | WO 2017/121520 | A1 | 7/2017 | |

OTHER PUBLICATIONS

DE-69633105-T2, all pages, (Year: 2005).*
DE-102018218866-A1, all pages (Year: 2020).*
DE-102016200186-A1, all pages (Year: 2017).*
WO-2014117773-A2, all pages (Year: 2014).*
JP-2004297976-A, all pages (Year: 2004).*
WO-2014147072-A1, all pages (Year: 2014).*
CN-103122125-A, all pages (Year: 2013).*
CN-111040698-A, all pages (Year: 2020).*
International Search Report (PCT/ISA/210) issued in PCT Application No. PCT/EP2021/066572 dated Sep. 30, 2021 with English translation (six (6) pages).
German-language Written Opinion (PCT/ISA/237) issued in PCT Application No. PCT/EP2021/066572 dated Sep. 30, 2021 (five (5) pages).
German-language Search Report issued in German Application No. 10 2020 117 995.2 dated Mar. 23, 2021 with partial English translation (12 pages).

* cited by examiner

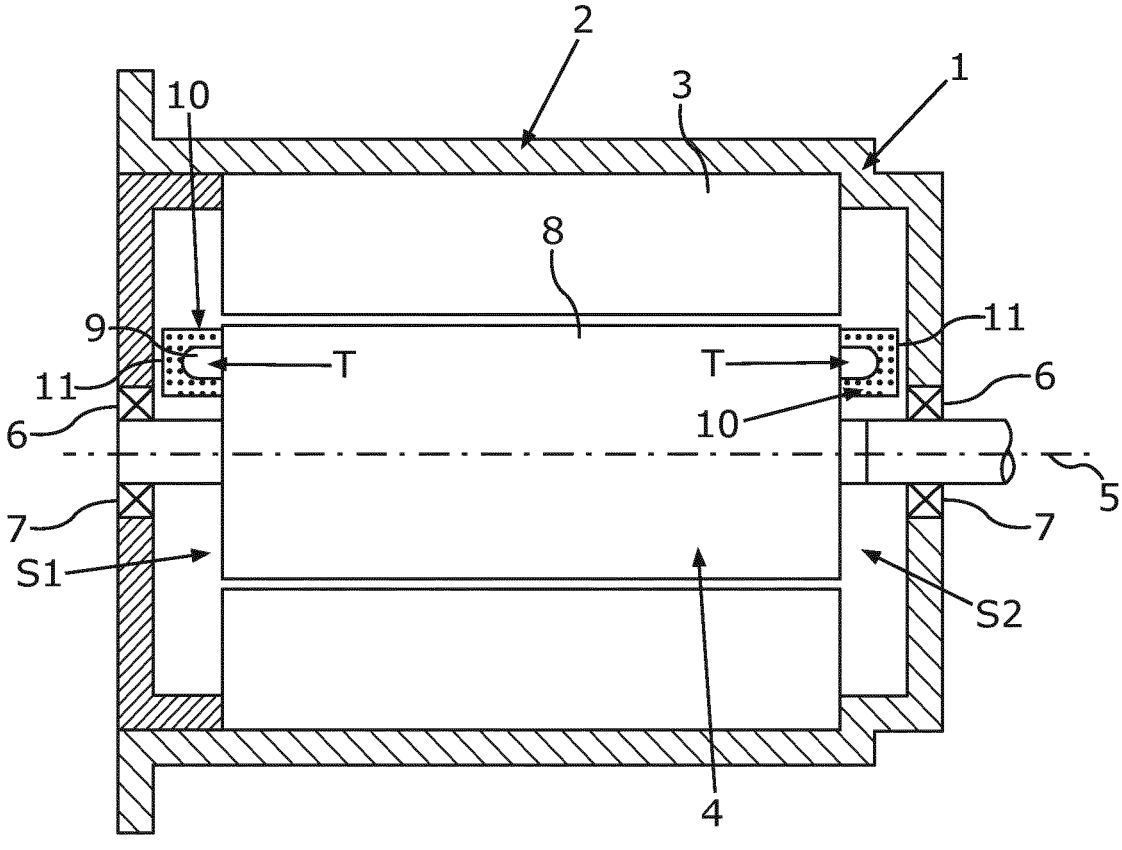

ELECTRIC MACHINE FOR A MOTOR VEHICLE, USE OF SUCH AN ELECTRIC MACHINE, AND MOTOR VEHICLE

BACKGROUND AND SUMMARY OF THE INVENTION

The invention relates to an electric machine for a motor vehicle with at least one winding which has at least one subregion embedded in a potting material. The invention furthermore relates to use of such an electric machine. The invention also relates to a motor vehicle, in particular a car, having an electric machine by way of which the motor vehicle can be driven.

WO 2017/121520 A1 discloses an electric machine with a housing and with a stator, inside the housing, which surrounds a rotor arranged fixedly on a motor shaft and has a rotating field winding which form in each case a winding head at the end sides of the stator. The winding heads are here embedded in a thermally conductive potting material. WO 2015/071901 A2 discloses an electric machine. The electric machine has a rotor and a stator, surrounding the rotor, with a plurality of stator windings consisting of electrical conductors. The electric machine moreover has two winding heads, wherein each of the winding heads is held in annular potting compound made from an electrically insulating material. DE 101 22 425 A1 moreover discloses an electric machine with winding heads.

The object of the present invention is to provide an electric machine, use of such an electric machine, and a motor vehicle such that particularly advantageous operation can be achieved.

This object is achieved according to the claimed invention.

A first aspect of the invention relates to an electrical machine for a motor vehicle, in particular for a car and most especially for a passenger car. This means that the motor vehicle includes the electric machine in its completed state. The electric machine is preferably designed as a so-called traction machine such that the motor vehicle can be driven (in particular purely) electrically by way of the electric machine. In order to be able to achieve, for example, particularly high electrical power to drive the motor vehicle (in particular purely) electrically, it is preferably provided that the electric machine is designed as a high-voltage component. It should in particular be understood hereby that the electric machine has an electrical voltage, in particular an electrical operating or nominal voltage, which is less than 48 volts and preferably greater than 50 volts, in particular greater than 60 volts. The electrical voltage, in particular the electrical operating or nominal voltage, of the electric machine is preferably several hundred volts. In order to drive the motor vehicle (in particular purely) electrically by way of the electric machine, the electric machine is operated, for example, in motor mode and hence as an electric motor. For this purpose, the electric machine is supplied with electrical energy or electric current which is stored in an electrical storage facility of the motor vehicle which takes the form of, for example, a battery, in particular a high-voltage battery. The motor vehicle is thus preferably designed as a hybrid vehicle or alternatively as an electric vehicle, in particular a battery electric vehicle (BEV). The electric machine has at least one winding through which the abovementioned electrical energy can flow. In other words, the electrical energy which is stored and supplied by the energy store can flow through the winding. In particular, the winding is formed by at least one electrical conductor through which the electrical energy can flow. The conductor or the winding is, for example, formed from a metal and/or electrically conductive material. For example, the electric machine comprises a carrier, designed separately from the winding and also termed a carrier element, by which the winding is carried. In other words, the winding is held on the carrier, wound around at least a part of the carrier. The carrier is, for example, a laminated core which can be formed from electrical sheets.

The winding has at least one subregion which is embedded in a potting material. This means that at least the subregion of the winding head is held in the potting material, in particular in such a way that, for example, the potting material surrounds the subregion, completely encircling the circumference of the subregion. The potting material is preferably electrically insulating or electrically non-insulating. Within the scope of the present disclosure, a non-conductor, i.e. an electrically non-conductive material or substance, is to be understood in particular as such a material or substance that has an electrical conductivity of less than $10^{-8}$ Scm$^{-1}$ or a specific resistance of greater than $10^{-8}$ Ωcm. It is preferably provided here that the potting material is such a non-conductor.

In order to now be able to obtain particularly advantageous operation, it is provided according to embodiments of the invention that the potting material is a composite which has at least one cycloaliphatic epoxy resin and at least one anhydride. In other words, the potting material is according to embodiments of the invention a composite of at least one cycloaliphatic epoxy resin and at least one anhydride. The composite is also referred to as a system or formulation, wherein a or the formulation is to be understood as a combination of different components. A first component is according to embodiments of the invention the cycloaliphatic epoxy resin, the second component being the anhydride. The composite is also referred to as a mixture which includes the components, i.e. the at least one cycloaliphatic epoxy resin and the at least one anhydride. The cycloaliphatic epoxy resin is also referred to as a cycloaliphatic epoxy resin system or is a constituent of a cycloaliphatic epoxy resin system.

Because the potting material is the described composite, a particularly high glass transition temperature, also referred to as the DSC midpoint, of the potting material can be achieved, wherein in particular a glass transition temperature of the potting material of greater than 200 degrees Celsius can be obtained. The invention is based in particular on the following insights: conventional, proven potting materials, also referred to as potting systems, into which at least respective subregions of respective windings are embedded, display a maximum glass transition temperature (in particular according to the DSC midpoint) of 200 degrees Celsius for automotive applications. Potting systems with glass transition temperatures greater than this are not known. Thermal expansion in an operating range of the electric machine can be kept particularly low by potting systems with a glass transition temperature (Tg) greater than 200 degrees Celsius. The operational durability, the performance, and the lifetime of the electric machines increase as a result.

Technical solutions were sought and developed as part of tests and developments in which respective subregions of windings of electric machines were embedded in epoxy resin systems. In the course of these, the potting material according to embodiments of the invention was found which can have a particularly high glass transition temperature and hence enable particularly advantageous operation of the electric machine. In the course of producing the electric machine, for example the potting material also referred to simply as resin, is introduced in liquid form at least into a part of the electric machine, in particular by potting, in such a way that at least the subregion of the winding is embedded in the initially liquid resin. The initially liquid resin is then cured such that the initially liquid potting material becomes hard. As a result, at least the subregion of the winding is embedded in the then hard potting material. The potting material here comprises, for example, at least one or more resin components and at least one or more curing components, wherein the resin component includes at least the at least one cycloalipathic epoxy resin. The resin moreover comprises the at least one anhydride. The cured resin or potting material should withstand very high temperatures during operation of the electric machine without being damaged, which can now be achieved by the potting material according to embodiments of the invention. Particularly high performance of the electric machine can be ensured as a result. It is in particular conceivable that the curing component includes the at least one anhydride such that, for example, the potting material is an anhydride-cured epoxy system or epoxy resin system which comprises the at least one cycloalipathic epoxy resin.

The at least one anhydride is to be understood as a chemical compound which is the result of water having been removed from an acid or base. In particular, the at least one anhydride is used as a curing agent or curing component in order to cure the potting material. It is thus provided within the scope of the abovementioned method that at least the subregion of the winding is provided with the potting material in a liquid state of the potting material, which, at least in its liquid state, is the composite of the at least one cycloalipathic epoxy resin and the at least one anhydride, after which the initially liquid potting material is cured. At least the subregion of the winding is embedded in the potting material as a result.

In order to be able to achieve a particularly high glass transition temperature of the potting material and hence a particularly high performance of the electric machine, it is provided in an embodiment of the invention that the composite also includes at least one mineral filler. The formulation can thus be a mineral-filled formulation, wherein the mineral filler is formed, for example, by mineral particles. In other words, the mineral filler can take the form of, for example, granular material which can be incorporated into the epoxy resin and into the anhydride.

A further embodiment is characterized in that the cycloalipathic epoxy resin takes the form of a 3,4-epoxycyclohexylmethyl-3,4-epoxycyclohexane carboxylate. The latter has, or at least had on the application date of the present patent application, the CAS number 2386-87-0. The use of this cycloalipathic epoxy resin can constitute a particularly high glass transition temperature. 3,4-Epoxycyclohexylmethyl-3, 4-epoxycyclohexane carboxylate is also referred to as 3,4-epoxycyclohexylmethyl-3',4'-epoxycyclohexane carboxylate.

A further embodiment is characterized in that the at least one anhydride is a methyl-5-norbornene-2,3-dicarboxylic anhydride. A particularly high glass transition temperature of the potting material can be achieved as a result, wherein the glass transition temperature of the potting material can lie within a range from and including 240 degrees Celsius up to and including 250 degrees Celsius. Particularly high performance of the electric machine can be represented as a result.

In order to be able to achieve a particularly high performance of the electric machine, in a further embodiment of the invention it is provided that the subregion of the winding has at least one winding head of the winding, the winding head of which protrudes from the carrier carrying the winding.

In a further particularly advantageous embodiment of the invention, the electric machine comprises a stator and a rotor which can be driven by the stator and consequently can rotate about an axis of rotation relative to the stator. The electric machine can supply via the rotor at least one torque for driving the motor vehicle (in particular purely) electrically. It is preferably provided here that the winding is a constituent of the rotor. In other words, it is preferably provided that the winding takes the form of a rotor winding of the rotor. Particularly high performance of the electric machine can be represented as a result.

A second aspect of the invention relates to use of an electric machine according to the first aspect of the invention, wherein the electric machine is used as a constituent of a drive train of a motor vehicle in order to drive the motor vehicle (in particular purely) electrically by way of the electric machine. Advantages and advantageous embodiments of the first aspect of the invention should be viewed as advantages and advantageous embodiments of the second aspect of the invention, and vice versa. It has been shown that the use of the electric machine is particularly advantageous for electrically driving a motor vehicle because, particularly in the case of such a mobile application, the electric machine should have particularly high performance and also withstand particularly high temperatures without being damaged. This can be ensured by the composite according to embodiments of the invention or by the potting material according to embodiments of the invention.

A third aspect of the invention relates to a motor vehicle preferably in the form of a car, in particular a passenger car, which includes an electric machine, in particular according to the first aspect of the invention. The motor vehicle can be driven (in particular purely) electrically by way of the electric machine. The electric machine here has at least one winding which comprises at least one subregion embedded in a potting material.

In order to be able to achieve particularly high performance of the electric machine and hence particularly advantageous operation, it is provided according to embodiments of the invention that the potting material is a composite or a mixture which is also referred to as a formulation and includes at least one cycloalipathic epoxy resin and at least one anhydride. Advantages and advantageous embodiments of the first aspect of the invention and of the second aspect of the invention should be viewed as advantages and advantageous embodiments of the third aspect of the invention, and vice versa.

Further details of the invention become apparent from the following description of a preferred embodiment with the associated drawing.

BRIEF DESCRIPTION OF THE DRAWING

The single FIGURE here shows a schematic side view in section of an electric machine according to embodiments of the invention for a motor vehicle.

DETAILED DESCRIPTION OF THE DRAWING

The single FIGURE here shows a schematic side view in section of an electric machine 1 for a motor vehicle. This means that the motor vehicle which preferably takes the form of a car, in particular a passenger car, includes the electric machine 1 in its completed state. The electric machine 1 is here a constituent of a drive train of the motor vehicle which can be driven by way of the drive train. The motor vehicle can here be driven (in particular purely) electrically by way of the electric machine 1 such that the electric machine 1 is a traction machine or is also referred to as a traction machine.

The motor vehicle moreover comprises an electrical energy store in or by way of which electrical energy or electrical current can be stored. In particular, the energy store can be designed as a battery, in particular as a high-voltage (HV) battery. It is thus preferably provided that the electrical machine 1 and the energy store are designed as high-voltage components, the respective electrical voltage, in particular operating of nominal voltage, of which is at least 48 volts and preferably is greater than 50 volts, in particular greater than 60 volts. Particularly high electrical power for electrically driving the motor vehicle can be achieved as a result.

In order to drive the motor vehicle electrically by way of the electric machine 1, the electric machine 1 is operated in motor mode and hence as an electric motor. For this purpose, the electric machine is supplied with the electrical energy stored in the energy store. The electric machine 1 can be operated, for example, also in generator mode and also as a generator. In generator mode, the electric machine 1 is driven, for example, by wheels of the rolling motor vehicle and hence by way of kinetic energy of the motor vehicle. The generator converts the kinetic energy into electrical energy which is supplied by the generator and can be stored, for example, in the energy store.

The electric machine 1 has a housing 2 and a stator 3 which is fixed, for example, on the housing 2. The electric machine 1 moreover comprises a rotor 4 which can be driven by the stator 3 and consequently can rotate about an axis of rotation 5 relative to the stator 3 and relative to the housing 2. The rotor 4 comprises a rotor shaft 6 via which the electric machine 1 can supply at least one torque in order to drive the motor vehicle (in particular purely) electrically. The rotor 4 is mounted on the housing 2 so that it can rotate in particular via the rotor shaft 6 by way of bearings 7. The respective bearing 7 is here designed, for example, as a rolling bearing.

The rotor 4 comprises a carrier 8, also referred to as a carrier element, which is designed, for example, separately from the rotor shaft 6 and is arranged on the rotor shaft 6. In particular, the carrier 8 is connected non-rotatably to the rotor shaft 6. The carrier 8 takes the form, for example, of a laminated core. The electric machine 1 furthermore comprises at least one winding 9, illustrated particularly schematically in the FIGURE and a portion of which is visible, which is designed as a constituent of the rotor and hence as a rotor winding in the exemplary embodiment shown in the FIGURE. The winding 9 is formed by at least one electrical conductor which is designed separately from the carrier 8 and is held on the carrier 8 and hence carried by the carrier 8. This means that the carrier 8 carries the winding 9. In particular, the conductor is wound around at least a part of the carrier 8, forming the winding 9.

It can be seen from the FIGURE that the winding 9 has winding heads 10 arranged on sides S1 and S2 of the carrier 8 which are averted from each other in the axial direction of the rotor 4. It can also be seen from the FIGURE that at least respective subregions T of the winding 9 are embedded in a potting material 11. The subregions T here comprise the winding heads 10 such that at least the winding heads 10 are embedded in the potting material 11.

In the course of a method for producing the electric machine 1, the respective subregion T and hence the respective winding head 10 are provided with the initially liquid potting material 11, after which the initially liquid potting material 11 is cured. As a result, the respective subregion T and hence the respective winding head 10 are embedded in the potting material 11 such that, in particular in the fully produced state of the electric machine 1, the winding heads 10 are embedded in the potting material 11 which has then been cured and hence has a solid form. For example, in the course of the method, the potting material 11 is introduced in liquid form or in a liquid state, in particular by way of potting, into the electrical machine 1, in particular into the rotor 4, after which the initially liquid potting material 11 is cured and as a result of which the winding heads 10 are embedded in the potting material 11. In particular, the liquid potting material 11 is introduced into the electric machine 1, in particular into the rotor 4, by adjusting the vacuum pressure.

In order to be able now to achieve particularly high performance of the electric machine 1 and hence particularly advantageous operation, the potting material 11 is a composite or a mixture which includes at least one cycloalipathic epoxy resin and at least one anhydride and preferably also a mineral filler. The potting material 11 thus takes the form of a mineral-filled epoxy resin system or a mineral-filled formulation which includes the at least one cycloalipathic epoxy resin and the at least one anhydride. A particularly high glass transition temperature of the potting material 11 can be achieved as a result such that the electric machine 1 also can withstand particularly high temperatures without being damaged. Particularly high-performance and efficient operation of the electric machine 1 can be ensured as a result.

LIST OF REFERENCE SYMBOLS 1 electric machine
2 housing
3 stator
4 rotor
5 axis of rotation
6 rotor shaft
7 bearing
8 carrier
9 winding
10 winding head
11 potting material
S1, S2 end side
T subregion

The invention claimed is:

1. An electric machine for a motor vehicle, the electric machine comprising:

a winding which has a subregion embedded in a potting material, wherein the potting material is a composite which includes a cycloalipathic epoxy resin and an anhydride, wherein the anhydride is methyl-5-norbornene-2,3-dicarboxylic anhydride, and wherein the potting material has a glass transition temperature between 200° C. and 250° C.

2. The electric machine as claimed in claim 1, wherein the composite also includes at least one mineral filler.

3. The electric machine as claimed in claim 1, wherein the cycloalipathic epoxy resin is 3,4-epoxycyclohexylmethyl-3, 4-epoxycyclohexane carboxylate.

4. The electric machine as claimed in claim 1, wherein the subregion has a winding head of the winding, and the winding head protrudes from a carrier carrying the winding.

5. The electric machine as claimed in claim 4, further comprising:

a stator and a rotor which can be driven by the stator and consequently is rotatable about an axis of rotation relative to the stator, wherein the winding is a constituent of the rotor.

6. A drive train of the motor vehicle, the drive train comprising the electric machine as claimed in claim 1, wherein the drive train is configured to drive the motor vehicle electrically by way of the electric machine.

7. A motor vehicle comprising:

an electric machine by way of which the motor vehicle is drivable, wherein:

the electric machine has a winding which has a subregion embedded in the potting material, the potting material is a composite which includes a cycloalipathic epoxy resin and an anhydride, the anhydride is methyl-5-norbornene-2,3-dicarboxylic anhydride, and the potting material has a glass transition temperature greater-than-between 200° C. and 250° C.

* * * * *